US006246556B1

(12) United States Patent
Haun et al.

(10) Patent No.: US 6,246,556 B1
(45) Date of Patent: Jun. 12, 2001

(54) ELECTRICAL FAULT DETECTION SYSTEM

(75) Inventors: Andrew A. Haun; Alan G. Coats; Kon B. Wong, all of Cedar Rapids; Robert F. Dvorak, Mt. Vernon; Gary W. Scott, Mount Vernon, all of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/026,193

(22) Filed: Feb. 19, 1998

Related U.S. Application Data

(60) Continuation-in-part of application No. 08/814,754, filed on Mar. 7, 1997, which is a division of application No. 08/600,512, filed on Feb. 13, 1996, now Pat. No. 5,682,101, which is a continuation-in-part of application No. 08/402,678, filed on Mar. 13, 1995, now abandoned, and a continuation-in-part of application No. 08/402,600, filed on Mar. 13, 1995, now abandoned, and a continuation-in-part of application No. 08/402,575, filed on Mar. 13, 1995, now abandoned, and a continuation-in-part of application No. 08/403,084, filed on Mar. 13, 1995, now abandoned, and a continuation-in-part of application No. 08/403,033, filed on Mar. 13, 1995, now abandoned.

(51) Int. Cl.$^7$ ............................................. H02H 3/00
(52) U.S. Cl. ............................................................ 361/42
(58) Field of Search ............................... 361/42–50, 93.6

(56) References Cited

U.S. PATENT DOCUMENTS

| H536 | 10/1988 | Strickland et al. ............... 324/456 |
| H538 | 11/1988 | Betzold ............................... 89/134 |
| Re. 30,678 | 7/1981 | Van Zeeland et al. ............ 361/44 |
| 2,808,566 | 10/1957 | Douma ................................ 324/127 |
| 2,832,642 | 4/1958 | Lennox ................................ 299/132 |
| 2,898,420 | 8/1959 | Kuze ................................... 200/87 |
| 3,471,784 | 10/1969 | Arndt et al. ........................ 324/126 |
| 3,538,241 | 11/1970 | Rein .................................... 174/143 |
| 3,588,611 | 6/1971 | Lambden et al. .................. 317/31 |
| 3,600,502 | 8/1971 | Wagenaar et al. ................. 174/143 |
| 3,622,872 | 11/1971 | Boaz et al. ......................... 324/52 |
| 3,660,721 | 5/1972 | Baird ................................... 361/55 |
| 3,684,955 | 8/1972 | Adams ................................ 324/72 |
| 3,716,757 | 2/1973 | Rodriguez .......................... 317/40 |
| 3,746,930 | 7/1973 | Van Best et al. .................. 317/31 |

(List continued on next page.)

FOREIGN PATENT DOCUMENTS

| 0094 871A1 | 5/1983 | (EP) | ............... H02H/1/00 |
| 0615327A2 | 9/1994 | (EP) | ............... H02H/1/00 |
| 0649207A1 | 4/1995 | (EP) | ............... H02H/1/00 |
| 0748021A1 | 12/1996 | (EP) | ............... H02H/1/00 |
| 0762591A2 | 3/1997 | (EP) | ............... H02H/1/00 |
| 0802602A2 | 10/1997 | (EP) | ............... H02H/1/00 |
| 0813281A2 | 12/1997 | (EP) | ............... H02H/1/00 |
| 2177561A | 6/1985 | (GB) | ............... H02H/1/00 |
| 2285886A | 7/1995 | (GB) | ............... H02H/1/00 |
| 0158365 | 6/1989 | (JP) | ............... G01R/15/02 |
| WO 97/30501 | 8/1997 | (WO) | ............... H02H/1/00 |

OTHER PUBLICATIONS

Antonio N. Paolantonio, P.E., Directional Couplers, R.F. Design, Sep./Oct., 1979, pp. 40–49.

(List continued on next page.)

Primary Examiner—Ronald W. Leja
(74) Attorney, Agent, or Firm—Kareem M. Irfan; Larry I. Golden

(57) ABSTRACT

An electrical fault detector system detects electrical faults in an electrical distribution system by monitoring one or more conductors and producing an input signal representing one or more electrical signal conditions in the circuit to be monitored. This input signal is processed to develop a first signal representing the electrical current flow through the monitored circuit and a second signal representing signal components in a selected frequency range typical of arcing faults, and which exceed a predetermined threshold. The system also detects ground faults in the circuit being monitored.

19 Claims, 14 Drawing Sheets

U.S. PATENT DOCUMENTS

| | | | |
|---|---|---|---|
| 3,775,675 | 11/1973 | Freeze et al. | 324/51 |
| 3,812,337 | 5/1974 | Crosley et al. | 235/153 AC |
| 3,858,130 | 12/1974 | Misencik | 335/18 |
| 3,869,665 | 3/1975 | Kenmochi et al. | 324/72 |
| 3,878,460 | 4/1975 | Nimmersjo | 324/52 |
| 3,911,323 | 10/1975 | Wilson et al. | 317/18 |
| 3,914,667 | 10/1975 | Waldron | 317/36 |
| 3,932,790 | 1/1976 | Muchnick | 317/18 D |
| 3,939,410 | 2/1976 | Bitsch et al. | 324/72 |
| 4,052,751 | 10/1977 | Shepard | 361/50 |
| 4,074,193 | 2/1978 | Kohler | 324/126 |
| 4,081,852 | 3/1978 | Coley et al. | 361/45 |
| 4,087,744 | 5/1978 | Olsen | 324/51 |
| 4,156,846 | 5/1979 | Harrold et al. | 324/158 |
| 4,166,260 | 8/1979 | Gillette | 335/20 |
| 4,169,260 | 9/1979 | Bayer | 340/562 |
| 4,214,210 | 7/1980 | O'Shea | 455/282 |
| 4,233,640 | 11/1980 | Klein et al. | 361/44 |
| 4,245,187 | 1/1981 | Wagner et al. | 324/54 |
| 4,251,846 | 2/1981 | Pearson et al. | 361/30 |
| 4,264,856 | 4/1981 | Friedrich et al. | 322/25 |
| 4,316,187 | 2/1982 | Spencer | 340/664 |
| 4,344,100 | 8/1982 | Davidson et al. | 361/45 |
| 4,354,154 | 10/1982 | Olsen | 324/51 |
| 4,356,443 | 10/1982 | Emery | 324/51 |
| 4,378,525 | 3/1983 | Burdick | 324/127 |
| 4,387,336 | 6/1983 | Joy et al. | 324/51 |
| 4,459,576 | 7/1984 | Fox et al. | 336/84 |
| 4,466,071 | 8/1984 | Russell, Jr. | 364/492 |
| 4,477,855 | 10/1984 | Nakayama et al. | 361/54 |
| 4,587,588 | 5/1986 | Goldstein | 361/54 |
| 4,616,200 | 10/1986 | Fixemer et al. | 335/35 |
| 4,639,817 | 1/1987 | Cooper et al. | 361/62 |
| 4,642,733 | 2/1987 | Schacht | 361/42 |
| 4,644,439 | 2/1987 | Taarning | 361/87 |
| 4,652,867 | 3/1987 | Masot | 340/638 |
| 4,658,322 | 4/1987 | Rivera | 361/37 |
| 4,697,218 | 9/1987 | Nicolas | 633/882 |
| 4,702,002 | 10/1987 | Morris et al. | 29/837 |
| 4,707,759 | 11/1987 | Bodkin | 831/642 |
| 4,771,355 | 9/1988 | Emery et al. | 361/33 |
| 4,810,954 | 3/1989 | Fam | 24/142 |
| 4,816,958 | 3/1989 | Belbel et al. | 361/93 |
| 4,833,564 | 5/1989 | Pardue et al. | 361/93 |
| 4,835,648 | 5/1989 | Yamauchi | 361/14 |
| 4,839,600 | 6/1989 | Kuurstra | 324/127 |
| 4,845,580 | 7/1989 | Kitchens | 361/91 |
| 4,847,719 | 7/1989 | Cook et al. | 361/13 |
| 4,853,818 | 8/1989 | Emery et al. | 361/33 |
| 4,858,054 | 8/1989 | Franklin | 361/57 |
| 4,866,560 | 9/1989 | Allina | 361/104 |
| 4,882,682 | 11/1989 | Takasuka et al. | 364/507 |
| 4,893,102 | 1/1990 | Bauer | 335/132 |
| 4,901,183 | 2/1990 | Lee | 361/56 |
| 4,922,368 | 5/1990 | Johns | 361/62 |
| 4,931,894 | 6/1990 | Legatti | 361/45 |
| 4,939,495 | 7/1990 | Peterson et al. | 337/79 |
| 4,949,214 | 8/1990 | Spencer | 361/95 |
| 4,969,063 | 11/1990 | Scott et al. | 361/93 |
| 5,010,438 | 4/1991 | Brady | 361/56 |
| 5,047,724 | 9/1991 | Boksiner et al. | 324/520 |
| 5,051,731 | 9/1991 | Guim et al. | 340/638 |
| 5,121,282 | 6/1992 | White | 361/42 |
| 5,166,861 | 11/1992 | Krom | 361/379 |
| 5,168,261 | 12/1992 | Weeks | 361/42 |
| 5,179,491 | 1/1993 | Runyan | 361/45 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,257,157 | 10/1993 | Epstein | 361/111 |
| 5,280,404 | 1/1994 | Ragsdale | 361/113 |
| 5,286,933 | 2/1994 | Pham | 361/42 |
| 5,307,230 | 4/1994 | MacKenzie | 361/96 |
| 5,334,939 | 8/1994 | Yarbrough | 361/42 |
| 5,353,014 | 10/1994 | Carroll et al. | 340/638 |
| 5,359,293 | 10/1994 | Boksiner et al. | 324/544 |
| 5,363,269 | 11/1994 | McDonald | 361/42 |
| 5,373,241 | 12/1994 | Ham, Jr. et al. | 324/536 |
| 5,383,084 | 1/1995 | Gershen et al. | 361/113 |
| 5,388,021 | 2/1995 | Stahl | 361/56 |
| 5,396,179 | 3/1995 | Domenichini et al. | 324/546 |
| 5,412,526 | 5/1995 | Kapp et al. | 361/56 |
| 5,412,590 | 5/1995 | Tajali | 361/669 |
| 5,420,740 | 5/1995 | MacKenzie et al. | 361/45 |
| 5,424,894 | 6/1995 | Briscall et al. | 361/45 |
| 5,434,509 | 7/1995 | Blades | 324/536 |
| 5,444,424 | 8/1995 | Wong et al. | 335/172 |
| 5,446,431 | 8/1995 | Leach et al. | 335/18 |
| 5,448,443 | 9/1995 | Muelleman | 361/111 |
| 5,452,223 | 9/1995 | Zuercher et al. | 364/83 |
| 5,459,630 | 10/1995 | MacKenzie et al. | 361/45 |
| 5,473,494 | 12/1995 | Kurosawa et al. | 361/3 |
| 5,477,150 | 12/1995 | Ham, Jr. et al. | 324/536 |
| 5,481,235 | 1/1996 | Heise et al. | 335/18 |
| 5,483,211 | 1/1996 | Carrodus et al. | 335/18 |
| 5,485,093 | 1/1996 | Russell et al. | 324/522 |
| 5,493,278 | 2/1996 | MacKenzie et al. | 340/638 |
| 5,506,789 | 4/1996 | Russell et al. | 364/492 |
| 5,510,946 | 4/1996 | Franklin | 361/42 |
| 5,512,832 | 4/1996 | Russell et al. | 324/522 |
| 5,519,561 | 5/1996 | Mrenna et al. | 361/105 |
| 5,531,617 | 7/1996 | Marks | 439/723 |
| 5,546,266 | 8/1996 | Mackenzie et al. | 361/93 |
| 5,561,605 | 10/1996 | Zuercher et al. | 364/483 |
| 5,568,371 | 10/1996 | Pitel et al. | 363/39 |
| 5,578,931 | 11/1996 | Russell et al. | 324/536 |
| 5,590,010 | 12/1996 | Ceola et al. | 361/93 |
| 5,590,012 | 12/1996 | Dollar | 361/113 |
| 5,602,709 | 2/1997 | Al-Dabbagh | 361/85 |
| 5,608,328 | 3/1997 | Sanderson | 324/529 |
| 5,617,019 | 4/1997 | Etter | 324/117 |
| 5,638,244 | 6/1997 | Mekanik et al. | 361/62 |
| 5,646,502 * | 7/1997 | Johnson | 307/66 |
| 5,657,244 | 8/1997 | Seitz | 364/492 |
| 5,659,453 | 8/1997 | Russell et al. | 361/93 |
| 5,661,645 * | 8/1997 | Hochstein | 363/89 |
| 5,682,101 | 10/1997 | Brooks et al. | 324/536 |
| 5,691,869 | 11/1997 | Engel et al. | 361/45 |
| 5,701,110 | 12/1997 | Scheel et al. | 335/132 |
| 5,706,154 | 1/1998 | Seymour | 361/42 |
| 5,726,577 | 3/1998 | Engel et al. | 324/536 |
| 5,729,145 | 3/1998 | Blades | 324/536 |
| 5,764,125 | 6/1998 | May | 336/92 |
| 5,805,397 | 9/1998 | MacKenzie | 361/42 |
| 5,805,398 | 9/1998 | Rae | 361/42 |
| 5,815,352 | 9/1998 | Mackenzie | 361/42 |
| 5,818,237 | 10/1998 | Zuercher et al. | 324/536 |
| 5,818,671 | 10/1998 | Seymour et al. | 361/42 |
| 5,825,598 | 10/1998 | Dickens et al. | 361/42 |
| 5,834,940 | 11/1998 | Brooks et al. | 324/424 |
| 5,835,319 | 11/1998 | Welles, II et al. | 361/5 |
| 5,835,321 | 11/1998 | Elms et al. | 361/45 |

| | | | |
|---|---|---|---|
| 5,839,092 | 11/1998 | Erger et al. | 702/58 |
| 5,847,913 | 12/1998 | Turner et al. | 361/93 |
| 5,886,861 | 3/1999 | Parry | 361/42 |
| 5,889,643 | 3/1999 | Elms | 361/42 |
| 5,896,262 | 4/1999 | Rae et al. | 361/94 |
| 5,905,619 | 5/1999 | Jha | 361/93 |
| 5,933,308 | 8/1999 | Garzon | 361/62 |
| 5,946,179 | 8/1999 | Fleege et al. | 361/93 |

OTHER PUBLICATIONS

Alejandro Duenas, J., Directional Coupler Design Graphs For Parallel Coupled Lines and Interdigitated 3 dB Couplers, RF Design, Feb., 1986, pp. 62–64.

RV4145 Low Power Ground Fault Interrupter, Preliminary Product Specifications of Integrated Circuits, Raytheon Company Semiconductor Division, 350 Ellis Street, Mountain View CA 94309–7016, pp. 1–8. No Date.

Jean–Francois Joubert, Feasibility of Main Service Ground–Fault Protection On The Electrical Service To Dwelling Units, Consultants Electro–Protection Ins., 1980, Michelin St., Laval, Quebec H7L 9Z7, Oct. 26, 1990, pp. 1–77.

B.D. Russell, Detection Of Arcing Faults On Distribution Feeders, Texas A & M Research Foundation, Box H. College Station, Texas 77843, Final Report Dec., 1982, pp. 1–B18.

* cited by examiner

ELECTRICAL FAULT DETECTION SYSTEM

This application is a continuation-in-part of copending application Ser. No. 08/814,754, filed Mar. 7, 1997 and entitled ARCING FAULT DETECTION SYSTEM which is a division of Ser. No. 08/600,512, filed Feb. 13, 1996 now U.S. Pat. No. 5,682,101 and entitled ARCING FAULT DETECTION SYSTEM, which is a continuation-in-part of the following applications: Ser. No. 08/402,678, filed Mar. 13, 1995 and entitled DEVICE AND METHOD FOR BLOCKING SELECTED ARCING FAULT SIGNALS, now abandoned; Ser. No. 08/402,600, filed Mar. 13, 1995 and entitled VOLTAGE SENSING ARCING FAULT DETECTOR AND METHOD now abandoned; Ser. No. 08/402,575, filed Mar. 13, 1995 and entitled ARCING FAULT DETECTION SYSTEM AND METHOD, now abandoned; Ser. No. 08/403,084, filed Mar. 13, 1995 and entitled DEVICE AND METHOD FOR TESTING ARCING FAULT DETECTORS, now abandoned; and Ser. No. 08/403,033, filed Mar. 13, 1995 and entitled CURRENT SENSING ARCING FAULT DETECTOR AND METHOD, now abandoned.

Each of the above applications has the same assignee as the present invention, and each is incorporated herein by reference in its entirety.

FIELD OF THE INVENTION

The present invention relates to the protection of electrical circuits and, more particularly, to the detection of various electrical faults in an electrical circuit, for example an analysis of current flow in the circuit, detection of arcing faults and detection of ground faults.

BACKGROUND OF THE INVENTION

The electrical systems in residential, commercial and industrial applications usually include a panelboard for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed. Interruption of the circuit reduces the risk of injury or the potential of property damage from a resulting fire.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and reach an unacceptable temperature. Arcing faults can cause fire if combustible materials are in close proximity.

OBJECTS AND SUMMARY OF THE INVENTION

It is an object of the present invention to provide an electrical fault detection system and method which reliably detects electrical faults, including overcurrent conditions and ground faults, as well as arc fault conditions ignored by conventional circuit interrupters.

Still another object of the invention is to provide an electrical fault detection system which utilizes a minimum number of highly reliable electronic components to perform most of the signal processing and analyzing functions, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided an electrical circuit fault detector comprising band-pass filter circuit means responsive to an input signal representative of an electrical signal condition in a circuit to be monitored for passing a frequency signal comprising signal components of said input signal which fall within a first predetermined frequency band; threshold detector circuit means coupled to said band-pass filters circuit means and responsive to components of said frequency signal above a predetermined threshold amplitude for producing a corresponding frequency amplitude signal; and first frequency signal conditioning circuit means coupled to said threshold detector means and responsive to said frequency amplitude signal for producing a conditioned frequency amplitude output signal in a form suitable for input to a controller.

In accordance with another aspect of the invention, there is provided an electrical fault detector system comprising a first sensor operatively coupled with a circuit to be monitored for producing an input signal representative of a signal condition in said circuit to be monitored; a ground fault sensor operatively coupled with said circuit to be monitored for producing a ground fault input signal representative of a ground fault current in said circuit to be monitored; integrator circuit means coupled with said first sensor and responsive to said input signal for developing a current signal representative of current magnitude in said circuit to be monitored; band-pass filter circuit means operatively coupled with said first sensor and responsive to said input signal for passing a frequency signal comprising signal components of said input signal in a predetermined frequency band; ground fault amplifier circuit means coupled with said ground fault sensor for amplifying said input signals to produce amplified ground fault signals; and signal conditioning circuit means coupled with said band-pass filter circuit means, said integrator circuit means and said ground fault amplifier circuit means for receiving and conditioning said current signal, said frequency signal and said amplified ground fault signal to produce conditioned output signals in a form suitable for input to a controller.

In accordance with another aspect of the invention, there is provided a method of detecting arcing faults in an electrical distribution system that includes a line conductor connected to a load, said method comprising monitoring the line conductor and producing a corresponding input signal; and band-pass filtering said input signal at two predetermined frequency bands.

In accordance with another aspect of the invention, there is provided an application specific integrated circuit comprising band-pass filter circuit means responsive to an input signal representative of a signal condition in a circuit to be monitored for passing a frequency signal comprising signal components of said input signal which fall within a first predetermined frequency band; threshold detector circuit means coupled to said band-pass filters circuit means and responsive to components of said frequency signal above a predetermined threshold amplitude for producing a corresponding frequency amplitude signal; and first frequency signal conditioning circuit means coupled to said threshold detector circuit means and responsive to said frequency amplitude signal for producing a conditioned frequency amplitude output signal in a form suitable for input to a controller.

In accordance with another aspect of the invention, there is provided an electrical fault detector circuit comprising current fault detector circuit means for developing a current signal representative of current magnitude in said circuit to be monitored; arcing fault detector circuit means for developing an arcing fault signal in response to detection of an arcing fault in said circuit to be monitored; and ground fault detector circuit means for producing a ground fault signal in response to detection of a ground fault in the circuit to be monitored.

In accordance with another aspect of the invention, there is provided an application specific integrated circuit for an electrical fault detector system comprising current fault detector circuit means for developing a current signal representative of current magnitude in said circuit to be monitored; arcing fault detector circuit means for developing an arcing fault signal in response to detection of an arcing fault signal in said circuit to be monitored; and ground fault detector circuit means for producing a ground fault signal in response to detection of a ground fault in the circuit to be monitored.

In accordance with another aspect of the invention, there is provided a power supply circuit comprising a voltage regulator circuit for producing a regulated DC voltage; and a zener diode in series with a ground circuit of said voltage regulator circuit for producing positive and negative regulated DC output voltages.

In accordance with another aspect of the invention, there is provided a power supply circuit comprising a rectifier circuit; a series capacitor between a source of line voltage and said rectifier circuit for efficiently dropping said line voltage; and a voltage regulator operatively coupled with said bridge circuit for producing a regulated DC voltage.

DESCRIPTION OF ILLUSTRATIVE EMBODIMENTS

Figure 1:
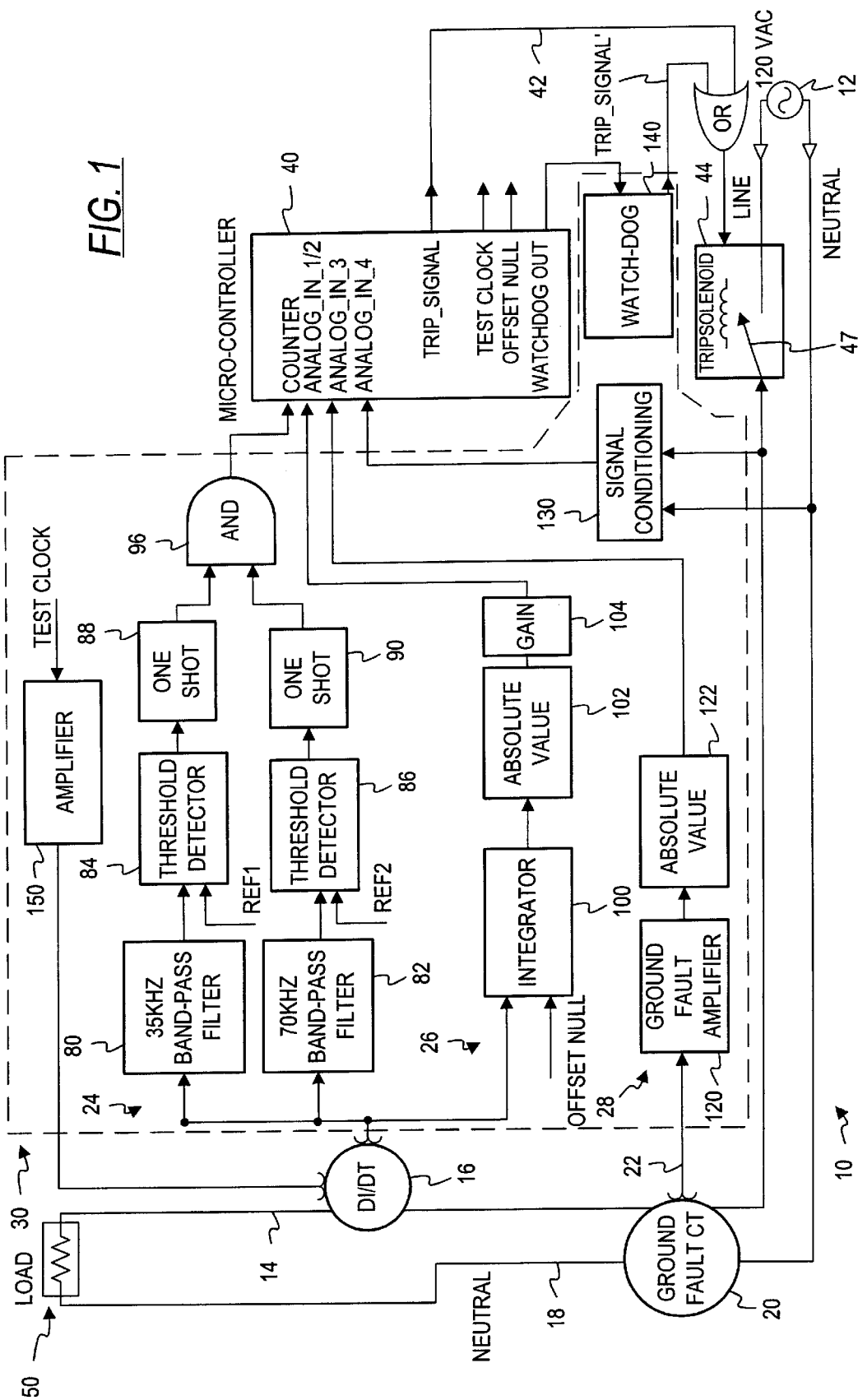
FIG. 1 is a functional block diagram of an electrical fault detection system embodying the invention.

Referring now to the drawings in initially to FIG. 1, there is shown in block form a novel electrical fault detector system in accordance with the invention, and designated generally by the reference numeral 10. In the illustrative example, the fault detection system 10 is associated with an electrical circuit such as a 120 VAC circuit 12 which is to be monitored for faults. Of course, the invention is not limited to use with a 120 VAC circuit. At least one sensor 16 is provided in association with the 120 VAC circuit 12 for producing a signal representative of a signal condition, such as power or current in the 120 VAC circuit 12. In the illustrated embodiment, this sensor 16 comprises a current rate of change sensor (di/dt). A line conductor 14 of the 120 VAC circuit 12 passes through the rate of change current sensor (di/dt) 16 which produces a current input signal representative of the rate of change of current flow in the line conductor 14. In the illustrative embodiment, both the line conductor 14 and a neutral circuit 18 of the 120 VAC circuit 12 flow through a ground fault detector or sensor 20 which is responsive to the current flowing through the line and neutral sides of the circuit 12 for producing an output signal at an output 22. If the current flow through the line and neutral conductors is different, this is indicative of a ground fault.

Preferably, the di/dt sensor 16 and the ground fault sensor 20 each comprise a toroidal coil having an annular core which surrounds the relevant conductors, with a toroidal sensing coil wound helically on the core. In the sensor 16, the core may be made of magnetic material such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing, so that arc detection is still possible. The particular requirements for the construction of the toroidal coil and core for the ground fault sensor 20 may differ somewhat for those for the di/dt sensor 16, such ground fault sensors or transformers being generally known in the art.

The di/dt sensor 16 provides an input to an arcing fault detector circuit 24 which is preferably a broadband noise detector circuit and a current fault detector circuit 26 which is preferably a current measuring circuit. The ground fault sensor 20 provides an input signal at line 22 to a ground fault detector circuit 28. Preferably, all of the components of the arcing fault detector circuit 24, the current fault detector circuit 26 and the ground fault detector circuit 28, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30 makes a decision as to whether to send a trip signal to an output 42 for activating a trip circuit 44 which will in effect switch the line side conductor 14 of the 120 VAC circuit 12 to an open circuit condition as indicated diagrammatically in FIG. 1, or whether to allow the line side 14 of the circuit 12 to remain connected to a load 50.

Figure 2:
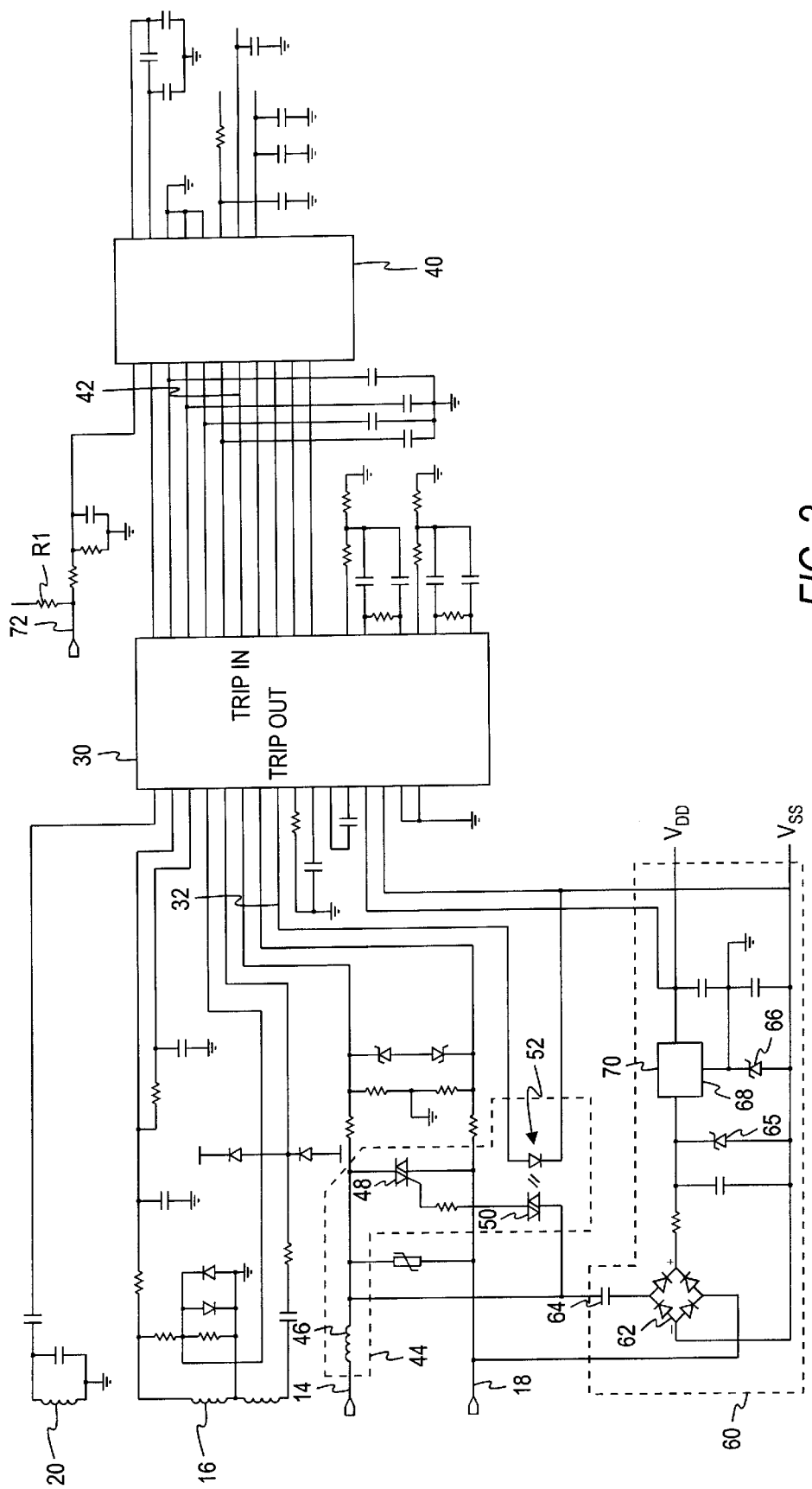
FIG. 2 is a schematic diagram of an electrical circuit for implementing the arc fault detection system illustrated in FIG. 1.

Referring also to FIG. 2, some additional details of the circuit of the invention are illustrated. In the embodiment illustrated in FIG. 2, the trip signal from the microcontroller output 42 is fed to the ASIC 30 where it is ORed with other signals (to be described later) for tripping the trip circuit 44, and fed to a trip output 32. The illustrated trip circuit 44 includes a trip coil 46, such as a solenoid coil which, when enough current is flowing through it, will activate a solenoid plunger causing it to release a mechanism within a circuit breaker thereby opening the contacts 47 and disconnecting the line from the load 50 as illustrated in FIG. 1. The trip circuit 44 as illustrated in FIG. 2 includes a triac 48 in series with the trip coil 46 and the neutral line 18. This triac 48 will be gated by a photo-sensitive triac 50, when the triac 50 is activated by the emission of light energy from a light emitting diode (LED) 52. The LED 52 is coupled to the "trip out" line 32 of the ASIC and to a negative reference voltage VSS so as to be energized for emitting light when a trip signal is given on the line 32.

Referring briefly to a power supply portion 60 in the circuit of FIG. 2, in the illustrative embodiment a full wave rectifier bridge circuit 62 is employed. Advantageously, a series capacitor 64 is coupled between the line conductor 14 and the rectifier bridge circuit 62 for efficiently dropping the line voltage. In the illustrative embodiment the capacitor has a value of substantially 0.56 microfarads so as to deliver approximately 15–25 volts AC into the rectifier bridge 62. This reduced line voltage is fully rectified and clamped to 14 volts by a 14 volt zener diode 65.

In accordance with another feature of the invention, the cathode of a zener diode 66 is coupled to the ground pin or ground circuit 68 of a voltage regulator 70. The voltage regulator 70 produces a +5 volt DC regulated voltage as VDD, while a similar −5 volt regulated voltage VSS is produced at the anode of the zener diode 66, which is preferably a 5.6 volt zener diode.

Also shown in FIG. 2 is a test switch input 72 to the microcontroller 40 for use in a "push to test" operation. That is, for purposes of testing the circuitry, when a test switch (not shown) coupled with this test switch input 72 is actuated, the resister R1 will cause a simulated ground fault signal to be injected into the ground fault current transformer 20 for purposes of testing for proper operation of the system.

Simultaneously, an AC voltage is coupled to a pin on the microcontroller, causing it to start a self test mode. The microcontroller 40 then will send a "test clock" signal to the ASIC 30 which will condition it and send a simulated arcing fault frequency signal to the di/dt coil 16. If all of the circuitry operates properly, the microcontroller should receive back signals indicating both a ground fault and an arcing fault. In accordance with a test program, only when both of these signals are received, the microcontroller will send an appropriate "trip" signal on line 42 to the "trip in" input of the ASIC 30 which will in turn send a trip signal on "trip out" line 32 to the trip circuit 44 to activate the trip coil 46. Preferably, trip coil 46 is part of a circuit breaker which may be manually reset following the test procedure.

It will be noted that FIG. 2 also indicates schematically the di/dt sensor coil 16 and the ground fault sensor coil 20 and related circuit components and their operative connections to the ASIC 30. Also, the operative connections of additional passive components, of line and neutral sides of the 120 VAC circuit, and of suitable regulated DC voltages from the voltage regulator circuit 60 with respect to the ASIC 30 and the microcontroller 40 are illustrated in FIG. 2.

Referring again to FIG. 1, additional components of the ASIC 30 will next be described.

The broadband noise detector 24 comprises first and second band-pass filter circuits 80, 82 which receive the rate of change of current signal from the di/dt sensor 16. In accordance with the invention, the band passes of these circuits 80 and 82 are selected at frequency bands which are representative of a frequency spectrum typical of arcing faults so as to substantially (statistically) eliminate signals at frequencies which may occur on the line which do not represent, that is are not due to, an arcing fault. In the illustrative embodiment, these band-pass frequencies are selected as typically 35 kilohertz and 70 kilohertz respectively. Each of the band-pass filter circuits 80 and 82 feeds a filtered signal, comprising those components of an input signal from the di/dt sensor which fall within their respective band-pass frequency bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal conditioning circuits 88 and 90 comprise ten microsecond one-shot circuits for producing a unit pulse signal. The output pulses generated by the one-shots 88 and 90 are squared up at respective wave squarers 92 and 94 (see FIG. 4) before being ANDed at an AND circuit 96 whose output is fed to a "counter" input of the microcontroller 40 as indicated in FIG. 1. In the illustrative embodiment, a one volt threshold is utilized by both of the threshold circuits 84 and 86. Further details of the arcing fault detector circuit 24 are also in FIGS. 3 and 4.

Figure 3A:
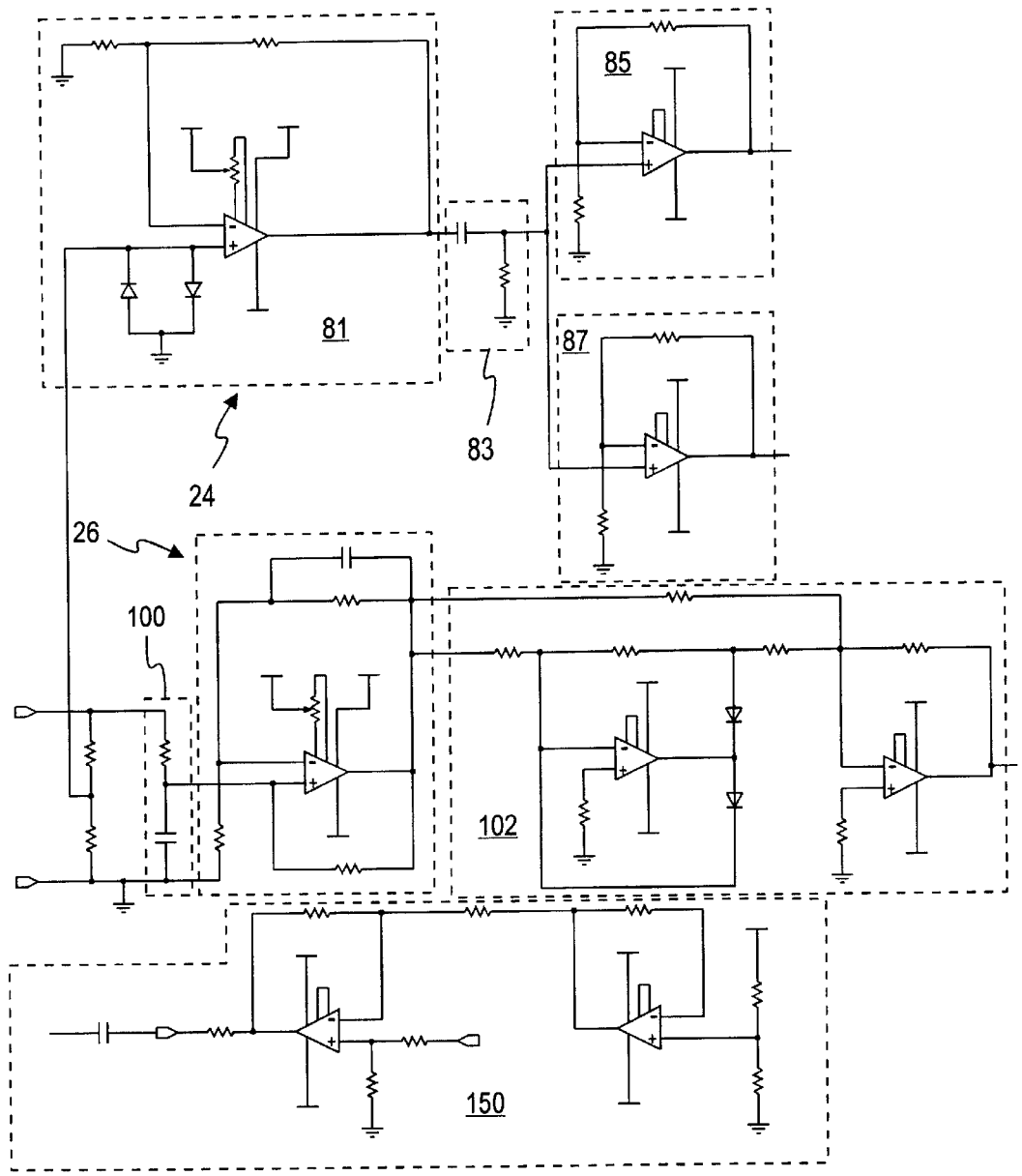
FIGS. 3A, 3B, 4A, 4B, 5 and 6 are schematic diagrams of further details of the electrical circuit of FIG. 2.
Figure 3B:
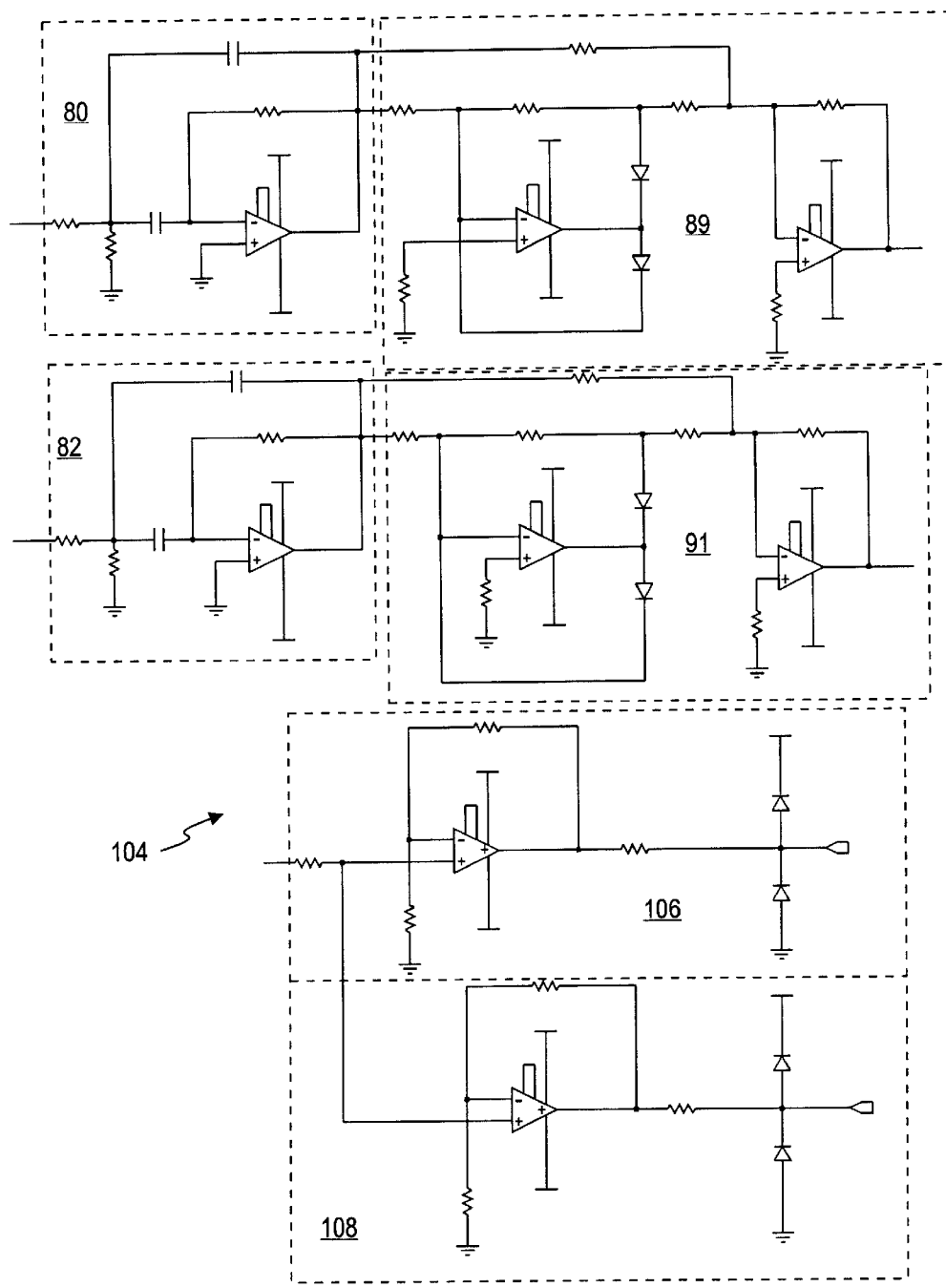
Figure 4A:
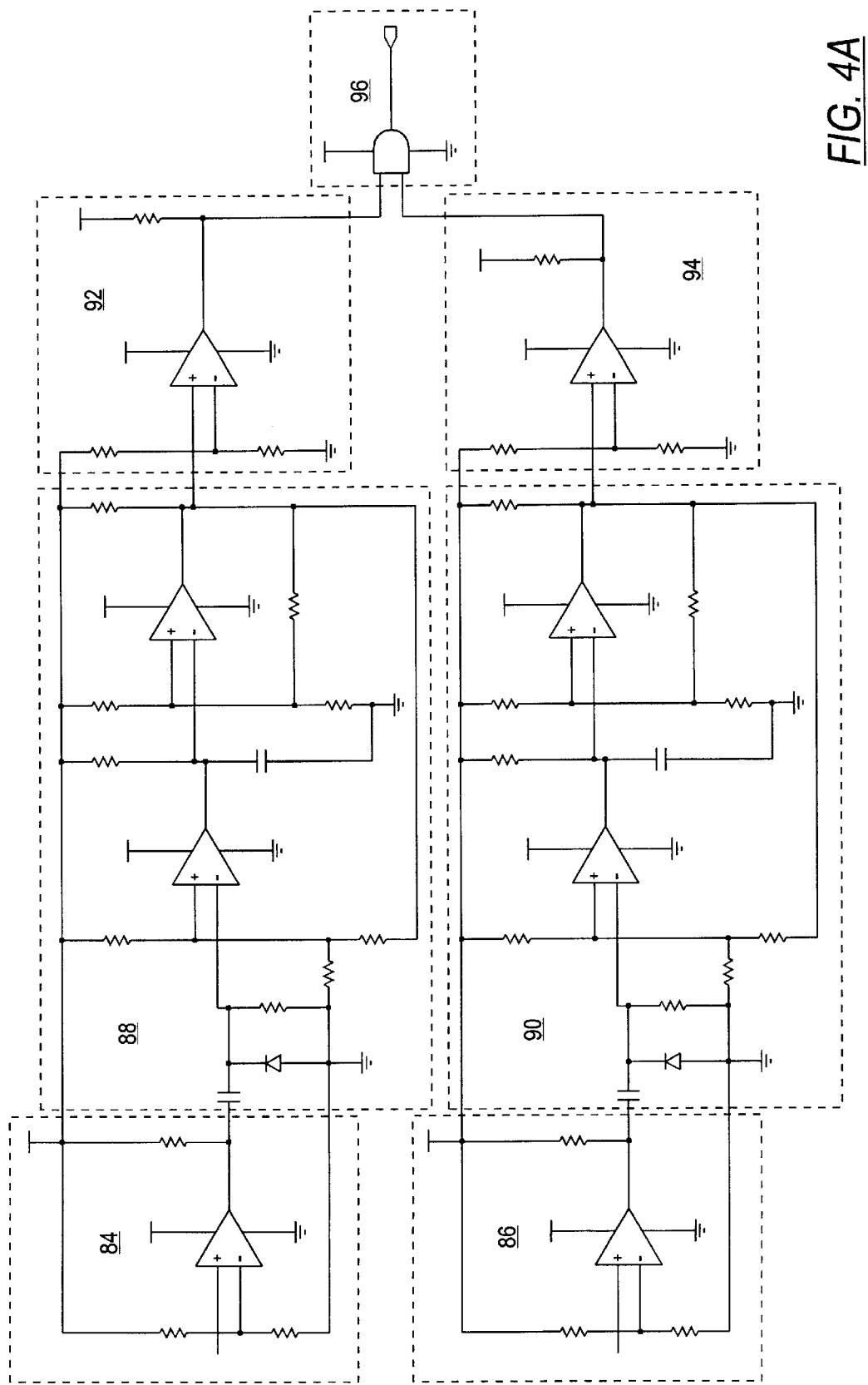
Figure 7A:
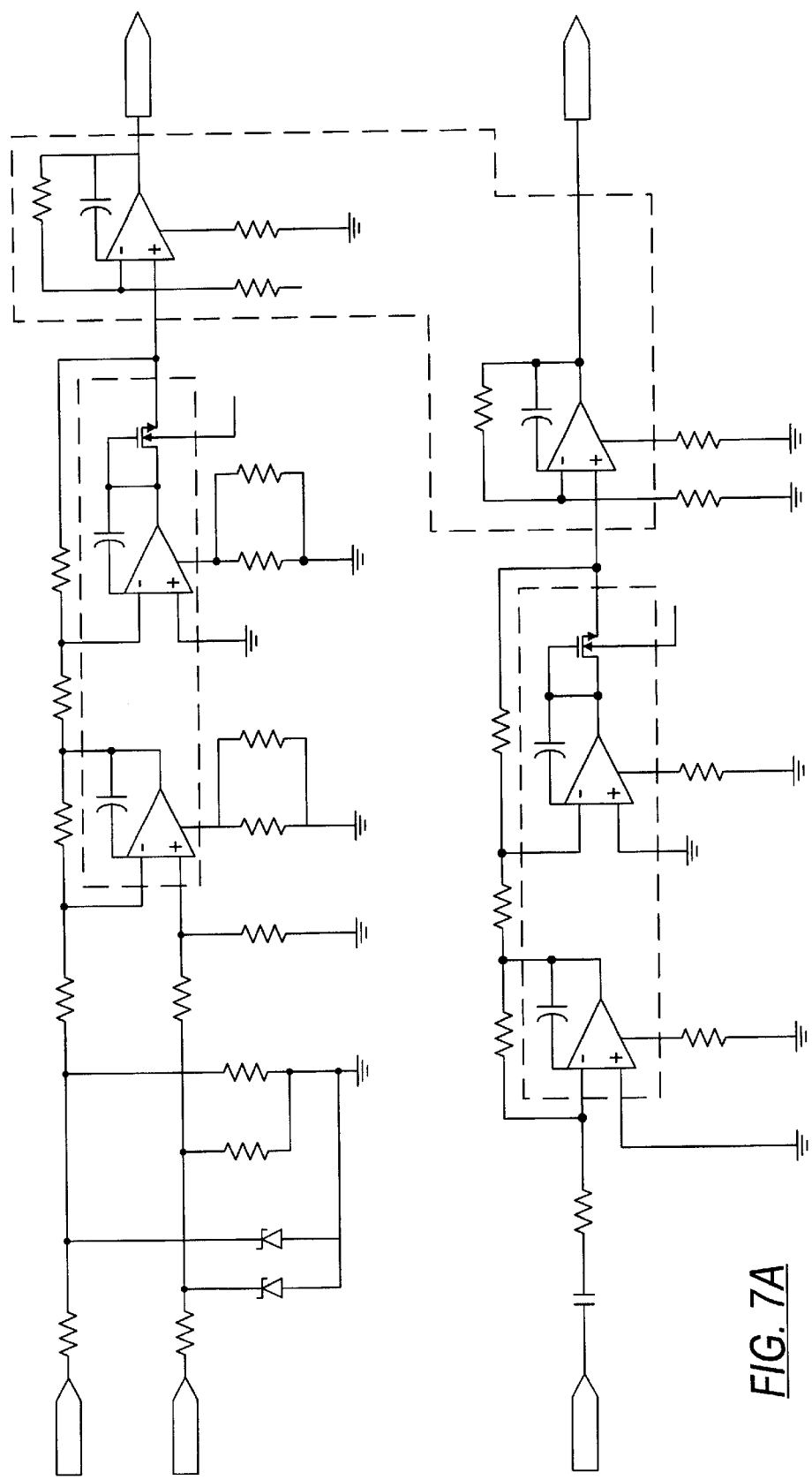
FIGS. 7A and 7B and 8A, 8B, 8C and 8D form a schematic diagram of an application specific integrated circuit (ASIC) which functions equivalently to the circuits of FIGS. 3–6.
Figure 7B:
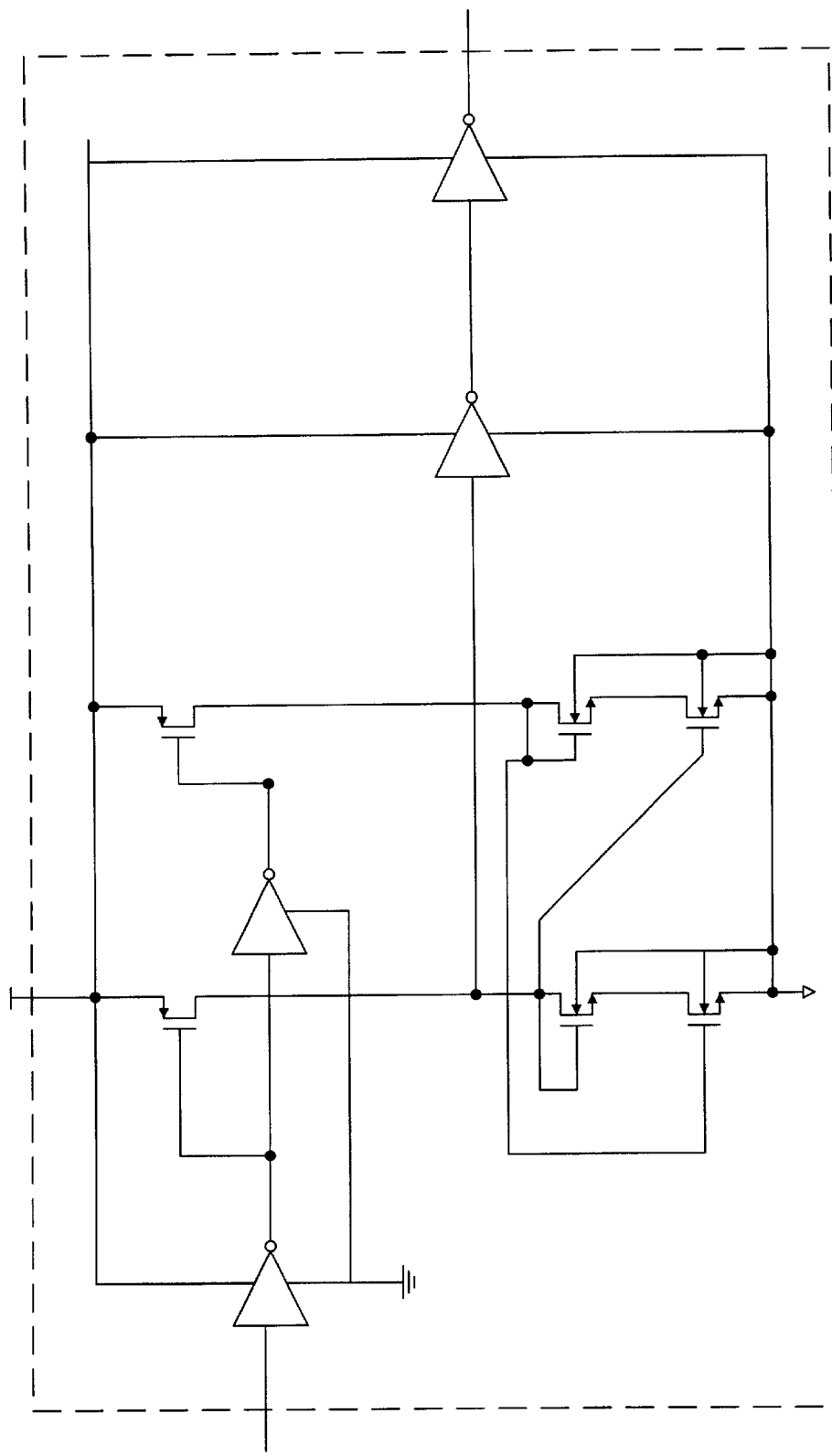
Figure 8A:
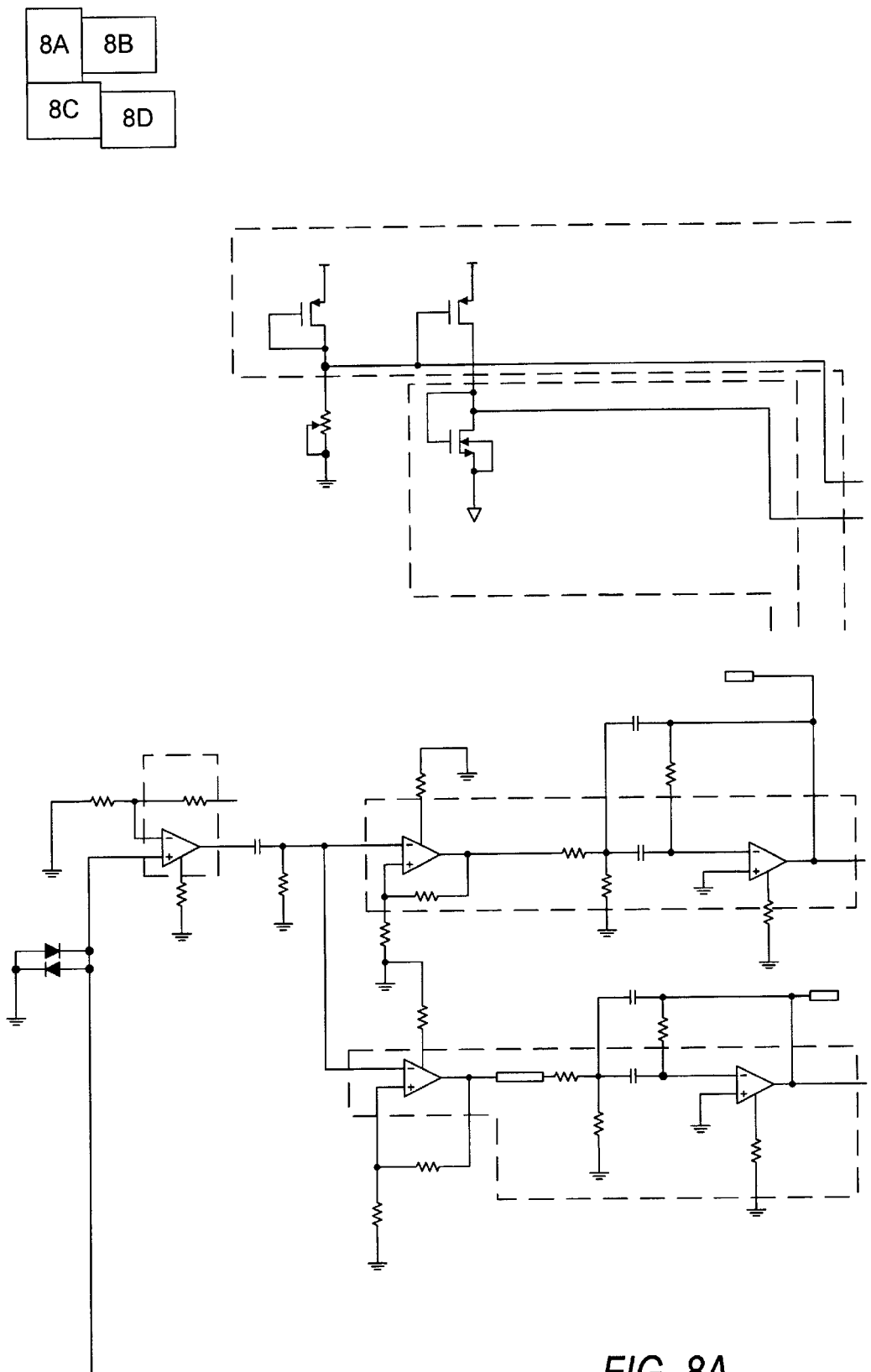
Figure 8B:
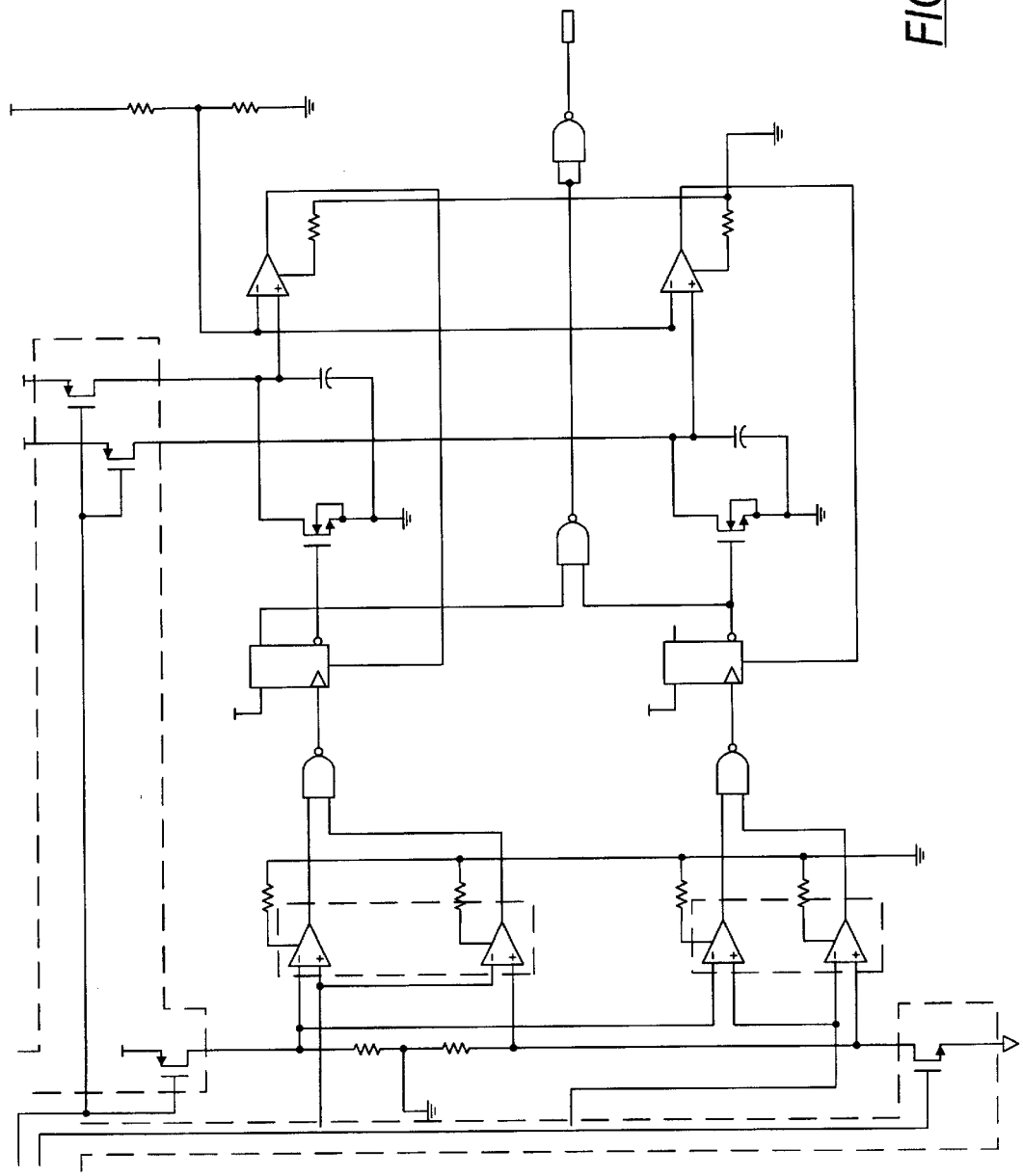
Figure 8C:
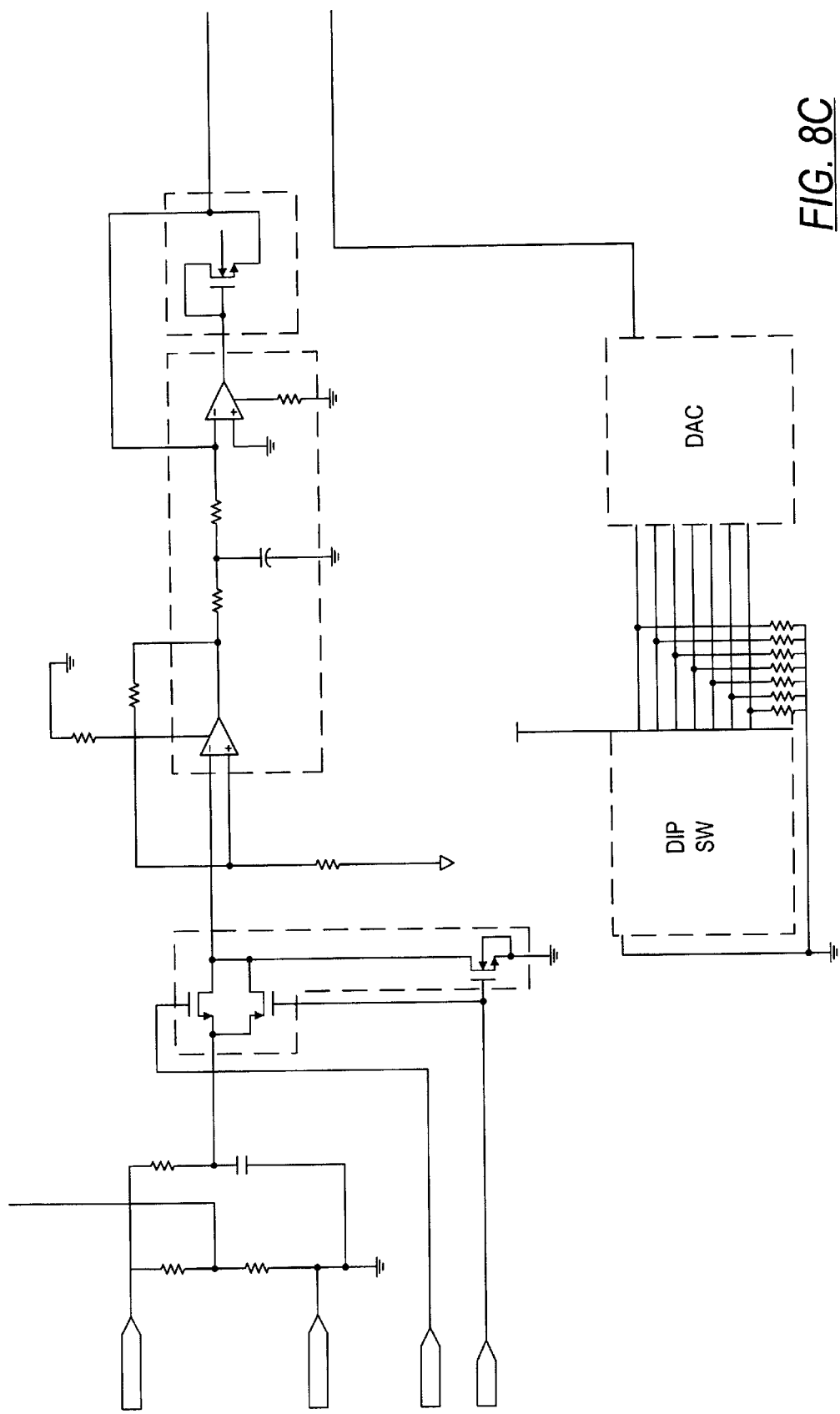
Figure 8D:
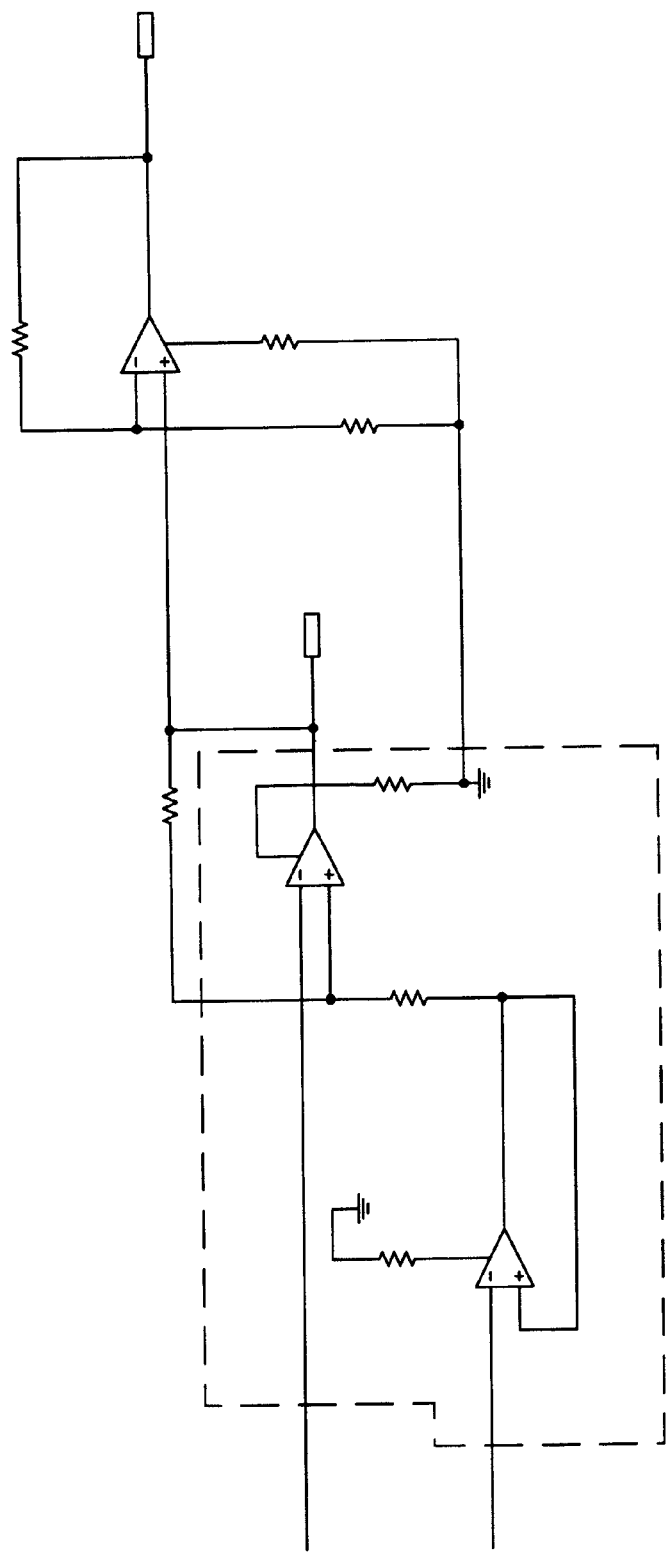

Referring briefly to FIGS. 3 and 4, these schematics have been broken into several parts labeled as 3A, 3B and 4A, 4B to facilitate illustration thereof In addition to the circuits thus far described, the arcing fault detector or broadband noise detector circuit portion 24 also includes an offset adjust circuit 81 which takes the relatively low level signals from the di/dt sensor 16 and adjusts them to eliminate offsets in the following stages. The offset adjust feeds a ten (10) kilohertz high-pass filter 83 which feeds into respective amplifiers 85 and 87 which in turn feed into the respective 35 kilohertz and 70 kilohertz band-pass filters 80 and 82 described above. The outputs of these band-pass filters feed into absolute value circuits 89 and 91 which also include amplifier stages which feed into the threshold detectors 84 and 86 which are illustrated in FIG. 4. It should be appreciated that these circuits as well as other circuits illustrated in FIGS. 3–6 which form part of the ASIC 30 are shown in equivalent circuit form. The circuit design of the ASIC 30 is as illustrated in FIGS. 7 and 8. However, the functions and operations of the ASIC are believed better understood by reference to the block diagram of FIG. 1 and the equivalent circuits of FIGS. 3–6. FIGS. 7 and 8 have also been broken into several parts labeled as 7A, 7B and 8A, 8B, 8C and 8D. The small diagram in the upper left portion of FIG. 8A shows how FIGS. 8A, 8B, 8C and 8D should be arranged.

Referring now again to FIG. 1, and also to FIG. 3, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 1 and a gain circuit 104 for producing a conditioned current output signal in a form suitable for input to the controller 40.

The absolute value circuit 102 is similar in its configuration and function to the absolute value circuits 89 and 91 described above. Briefly, all of these circuits take signals that are both negative- and positive-going and invert any negative going signals to positive signals while passing through positive-going signals unchanged.

The output of the absolute value circuit 102 is fed into the gain circuit 104 which includes a low current gain stage 106 and a high current gain stage 108. Briefly, the low current gain stage 106 applies a relatively greater amount of gain to relatively low currents so as to increase the resolution of the current signal for relatively low current levels. On the other hand, the high current gain stage 108 applies a relatively lower gain to relatively higher current levels in order to maintain a full range of current signal levels through the circuit. The outputs of the respective low current and high current gain stages are fed to the microcontroller 40.

Figure 6:
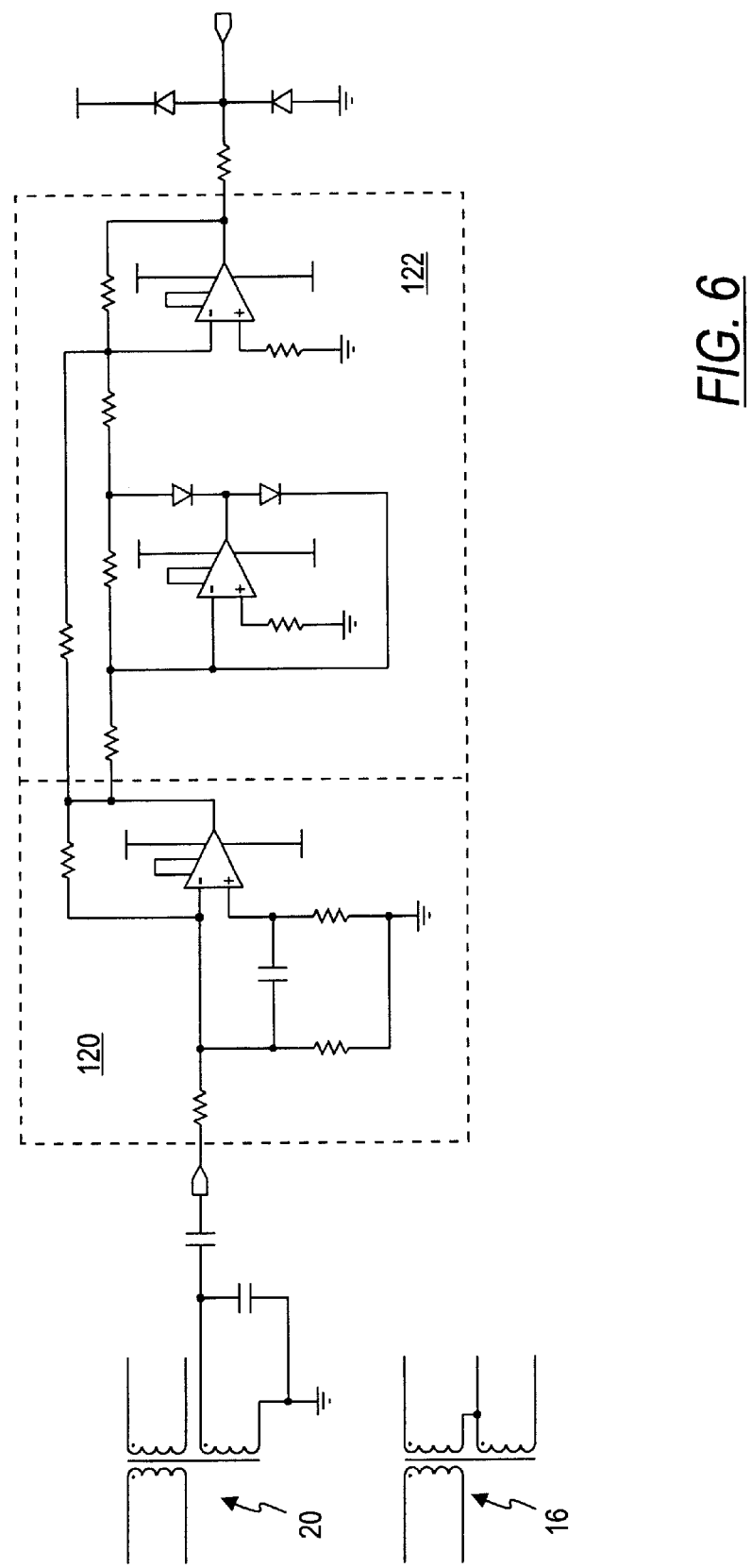

Referring again to FIG. 1 and also FIG. 6, the ground fault sensor 20 feeds a ground fault amplifier 120 and an absolute value circuit 122 which form the ground fault detector circuit 28. The ground fault amplifier 120 essentially amplifies the low level difference in current flow between the line 14 and neutral 18 as detected by the ground fault sensor 20. The absolute value circuit is similar in its operation and function to the absolute value circuits described above with reference to FIGS. 3 and 4, in that it essentially turns negative-going signals into positive signals and passes positive-going signals through unchanged.

Figure 4B:
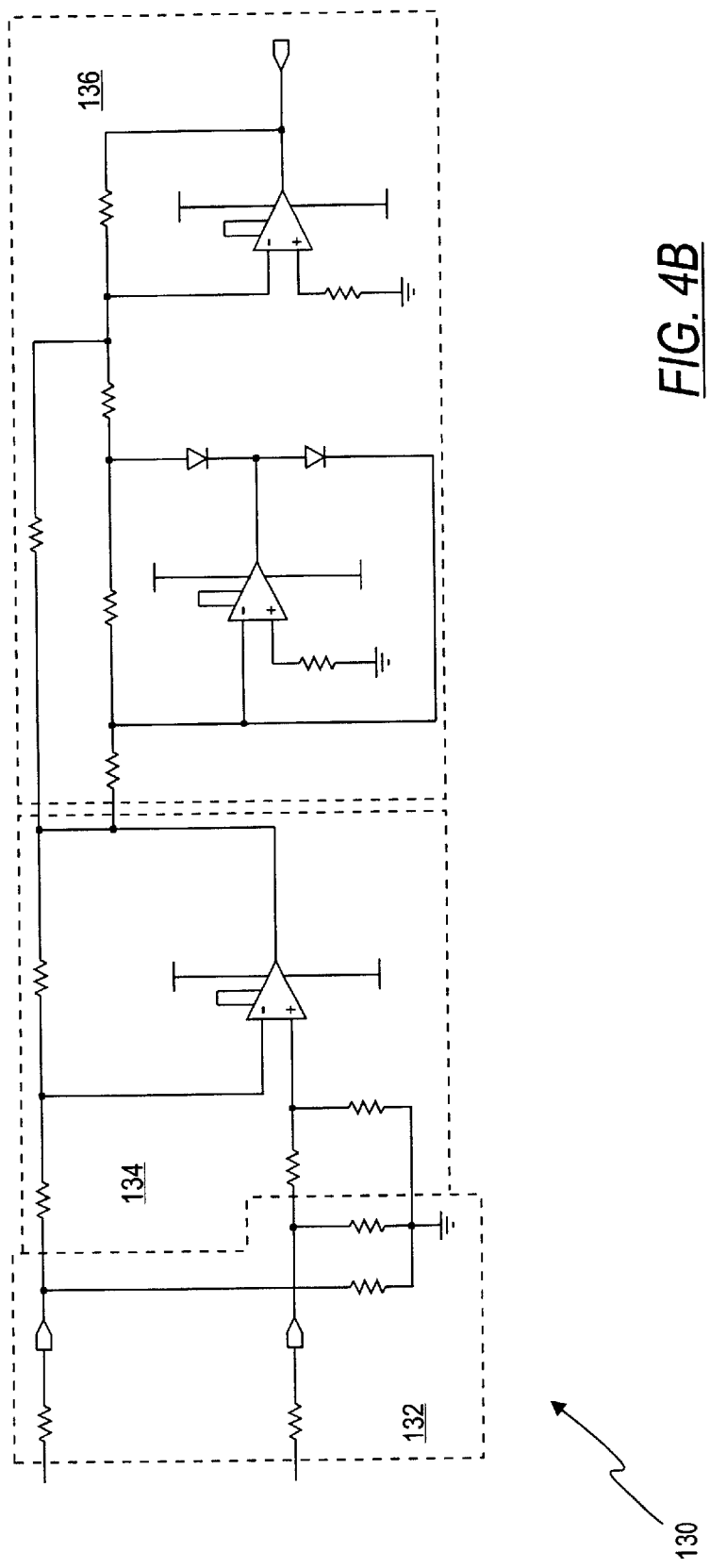

Referring now to FIG. 4B, the line voltage is also conditioned at a circuit 130 and fed to the microcontroller for further analysis and processing. This circuit 130 includes a line voltage divider 132 which divides the line voltage to a lower level suitable for further processing, a difference amplifier 134 which takes the output of the line voltage divider and level shifts it to circuit ground to be rectified, and an absolute value circuit 136. The voltage from the difference amplifier 134 is fed through the absolute value circuit 136 which has the same configuration and function as described above for the previously described absolute value circuits. The output of absolute value circuit 136 is fed to the microcontroller 40.

Figure 5:
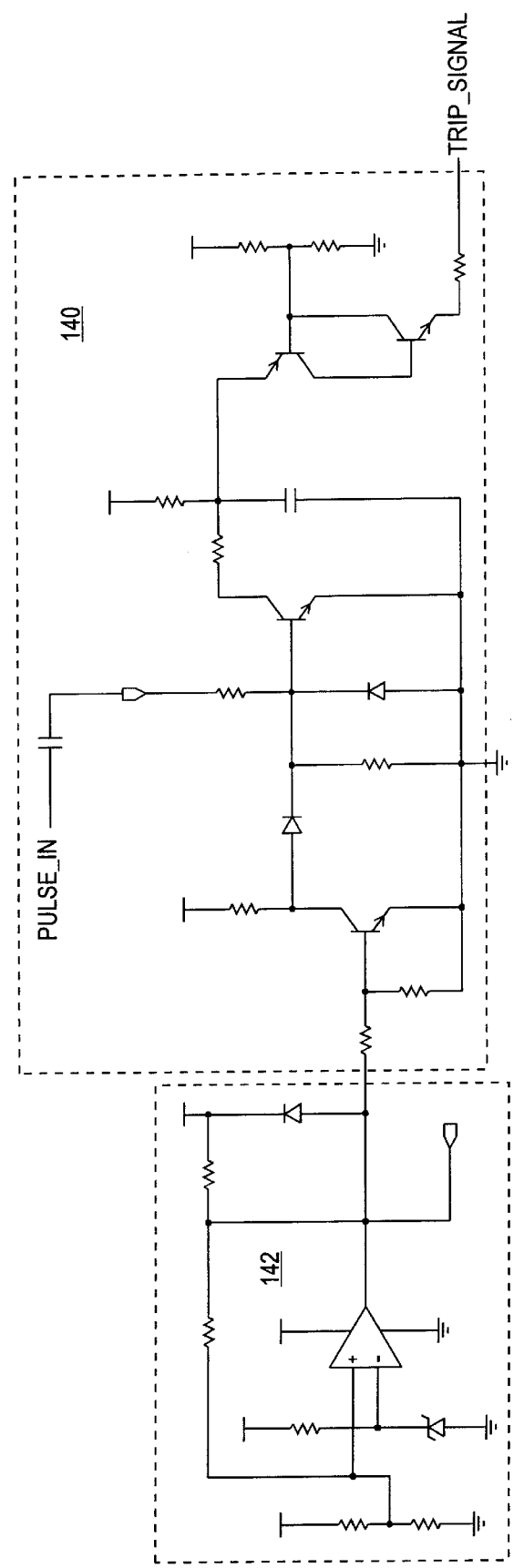

Referring again to FIG. 1 and also to FIG. 5, a watchdog circuit 140 takes a pulse input (Pulse_In) from the microcontroller 40 to check to see if the microcontroller is still active. If no pulses are present on this output from the microcontroller then a trip signal (Trip_Signal') is sent to the trip circuit by the watchdog circuit 140 (via line 32 of FIG. 2). A related circuit, a voltage (VDD) monitor 142 sends a reset signal (logic 0) to an input of the microcontroller 40 when VDD voltage falls below 4.0 volts DC so as to prevent microcontroller errors.

Referring to FIG. 3A, a "push to test" amplifier circuit 150 is shown. This test circuit portion is also shown and also designated by reference numeral 150 in FIG. 1. This circuit 150 receives the test clock signal from the microcontroller when the "push to test" switch at input 72 is actuated and conditions it for input to a test winding on the di/dt sensor 16 for purposes of the push to test function as described above.

As indicated above, FIGS. 1–8 illustrate one embodiment of an application specific integrated circuit for performing the above-described operations.

What has been illustrated and described here is a novel and improved electrical fault detector system including a novel detector circuit and a novel ASIC incorporating the detector circuit. Also described above is a novel and improved power supply circuit.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An integrated circuit for use in a processor-controlled device connected to at least one electrical power line so that the combination of the integrated circuit and the processor-controlled device can detect faults in the power line, said integrated circuit comprising:

a first input for receiving an alternating signal from an arcing-fault sensor coupled to said power line;

at least one band pass filter connected to said first input for passing those components of said alternating signal within a prescribed frequency band;

a threshold detector receiving the components of said alternating signal passed by said filter for comparing those signal components with a predetermined threshold and producing an output signal when the predetermined threshold is exceeded;

a pulse generator receiving the output signal from the threshold detector and producing a corresponding output pulse;

a first output receiving the output pulses from the pulse generator for coupling those pulses to a processor;

an integrator connected to said first input for integrating said alternating signal and producing a signal representing the resulting integral;

an absolute value circuit receiving the integral signal from said integrator and producing an output signal representing the absolute value of that integral;

a second output receiving the absolute-value integral signal for coupling that signal to the processor;

a second input for receiving a signal from a ground-fault sensor coupled to said power line;

an amplifier connected to said second input for amplifying the ground-fault signal from the ground-fault sensor;

an absolute value circuit receiving the amplified ground-fault signal and producing an output signal representing the absolute value of the amplified ground-fault signal; and a third output receiving the absolute-value ground-fault signal for coupling that signal to the processor.

2. The integrated circuit of claim which includes:

a second band pass filter connected to said first input for passing those components of said alternating signal within a second prescribed frequency band;

a second threshold detector receiving the components of said alternating signal passed by said second filter for comparing those signal components with a second predetermined threshold and producing an output signal when the second predetermined threshold is exceeded;

a second pulse generator receiving the output signal from the second threshold detector and producing a corresponding output pulse;

logic means receiving said output pulses from both said pulse generators and passing said pulses when output pulses from both pulse generators occur at substantially the same time, and said first output receiving the output pulses from said logic means for coupling those pulses to the processor.

3. The integrated circuit of claim 1, which includes a fourth input for receiving a test signal, an amplifier for adjusting the amplitude of said test signal, and a fourth output receiving the amplifier output for coupling the test signal to said arcing-fault sensor.

4. The integrated circuit of claim 1 which includes at least one power-line input for receiving the power line signal, signal conditioning means for adjusting at least the amplitude of the power line signal, and a power-line output receiving the adjusted power line signal for coupling that signal to the processor.

5. The integrated circuit of claim 1 which includes a watch-dog circuit for receiving a watch-dog signal output from the processor, determining from said watch-dog signal whether the processor is active, and producing a trip signal if it is determined that the processor is not active.

6. An integrated circuit for use in a processor-controlled device connected to at least one electrical power line so that the combination of the integrated circuit and the processor-controlled device can detect faults in the power line, said integrated circuit comprising:

a first input for receiving and alternating signal from an arcing-fault sensor coupled to said power line;

a first band pass filter connected to said first input for passing those components of said alternating signal within a first prescribed frequency band;

a first threshold detector receiving the components of the alternating signal passed by said first filter for comparing those signal components with a first predetermined threshold and producing an output signal when the first predetermined threshold is exceeded;

a first pulse generator receiving the output signal from the first threshold detector and producing a corresponding output pulse;

a second band pass filter connected to said first input for passing those components of said alternating signal within a second prescribed frequency band;

a second threshold detector receiving the components of said the alternating signal passed by said second filter for comparing those signal components with a second predetermined threshold and producing an output signal when the second predetermined threshold is exceeded;

a second pulse generator receiving the output signal from the second threshold detector and producing a corresponding output pulse;

logic means receiving said output pulses from both said pulse generators and passing said pulses when output pulses from both pulse generators occur at substantially the same time;

a first output receiving the output pulses from said logic means for coupling those pulses to a processor;

an integrator connected to said first input for integrating said alternating signal and producing a signal representing the resulting integral;

an absolute value circuit receiving the integral signal from said integrator and producing an output signal representing the absolute value of that integral;

a second output receiving the absolute-value integral signal for coupling that signal to the processor;

a second input for receiving a signal from a ground-fault sensor coupled to said power line;

an amplifier connected to said second input for amplifying the ground-fault signal from the ground-fault sensor;

an absolute value circuit receiving the amplified ground-fault signal and producing an output signal representing the absolute value of the amplified ground-fault signal; and a third output receiving the absolute-value ground-fault signal for coupling that signal to the processor;

a fourth input for receiving a test signal, an amplifier for adjusting the amplitude of said test signal, and a fourth output receiving the amplifier output for coupling the test signal to said arcing-fault sensor;

at least one power-line input for receiving the power line signal, signal conditioning means for adjusting at least the amplitude of the power line signal, and a power-line output receiving the adjusted power line signal for coupling that signal to the processor, and a watch-dog circuit for receiving a watch-dog signal output from the processor, determining from said watch-dog signal whether the processor is active, and producing a trip signal if it is determined that the processor is not active.

7. A circuit for use in a processor-controlled device connected to at least one electrical power line so that the combination of the circuit and the processor-controlled device can detect faults in the power line, said circuit comprising:

a first input for receiving an alternating signal from an arcing-fault sensor coupled to said power line;

at least one band pass filter connected to said first input for passing those components of said alternating signal within a prescribed frequency band;

a threshold detector receiving the components of said alternating signal passed by said filter for comparing those signal components with a predetermined threshold and producing an output signal when the predetermined threshold is exceeded;

a pulse generator receiving the output signal from the threshold detector and producing a corresponding output pulse;

a first output receiving the output pulses from the pulse generator for coupling those pulses to a processor;

an integrator connected to said first input for integrating said alternating signal and producing a signal representing the resulting integral;

an absolute value circuit receiving the integral signal from said integrator and producing an output signal representing the absolute value of that integral; and a second output receiving the absolute-value integral signal for coupling that signal to the processor.

8. The circuit of claim 7 which includes:

a second input for receiving a signal from a ground-fault sensor coupled to said power line;

an amplifier connected to said second input for amplifying the ground-fault signal from the ground-fault sensor;

an absolute value circuit receiving the amplified ground-fault signal and producing an output signal representing the absolute value of the amplified ground-fault signal; and a third output receiving the absolute-value ground-fault signal for coupling that signal to the processor.

9. The circuit of claim 7 which includes:

a second band pass filter connected to said first input for passing those components of said alternating signal within a second prescribed frequency band;

a second threshold detector receiving the components of said alternating signal passed by said second filter for comparing those signal components with a second predetermined threshold and producing an output signal when the second predetermined threshold is exceeded;

a second pulse generator receiving the output signal from the second threshold detector and producing a corresponding output pulse;

logic means receiving said output pulses from both said pulse generators and passing said pulses when output pulses from both pulse generators occur at substantially the same time, and said first output receiving the output pulses from said logic means for coupling those pulses to the processor.

10. The circuit of claim 7 which includes a fourth input for receiving a test signal, an amplifier for adjusting the amplitude of said test signal, and a fourth output receiving the amplifier output for coupling the test signal to said arcing-fault sensor.

11. The circuit of claim 7 which includes at least one power-line input for receiving the power line signal, signal conditioning means for adjusting at least the amplitude of the power line signal, and a power-line output receiving the adjusted power line signal for coupling that signal to the processor.

12. The circuit of claim 7 which includes a watch-dog circuit for receiving a watch-dog signal output from the processor, determining from said watch-dog signal whether the processor is active, and producing a trip signal if it is determined that the processor is not active.

13. A circuit for use in a processor-controlled device connected to at least one electrical power line so that the combination of the circuit and the processor-controlled device can detect faults in the power line, said circuit comprising:

a first input for receiving an alternating signal from an arcing-fault sensor coupled to said power line;

a first band pass filter connected to said first input for passing those components of said alternating signal within a first prescribed frequency band;

a first threshold detector receiving the components of the alternating signal passed by said first filter for comparing those signal components with a first predetermined threshold and producing an output signal when the first predetermined threshold is exceeded;

a first pulse generator receiving the output signal from the first threshold detector and producing a corresponding output pulse;

a second band pass filter connected to said first input for passing those components of said alternating signal within a second prescribed frequency band;

a second threshold detector receiving the components of said alternating signal passed by said second filter for comparing those signal components with a second predetermined threshold and producing an output signal when the second predetermined threshold is exceeded;

a second pulse generator receiving the output signal from the second threshold detector and producing a corresponding output pulse;

logic means receiving said output pulses from both said pulse generators and passing said pulses when output pulses from both pulse generators occur at substantially the same time;

a first output receiving the output pulses from said logic means for coupling those pulses to a processor;

an integrator connected to said first input for integrating said alternating signal and producing a signal representing the resulting integral;

an absolute value circuit receiving the integral signal from said integrator and producing an output signal representing the absolute value of that integral;

a second output receiving the absolute-value integral signal for coupling that signal to the processor;

a second input for receiving a signal from a ground-fault sensor coupled to said power line;

an amplifier connected to said second input for amplifying the ground-fault signal from the ground-fault sensor;

an absolute value circuit receiving the amplified ground-fault signal and producing an output signal representing the absolute value of the amplified ground-fault signal; and a third output receiving the absolute-value ground-fault signal for coupling that signal to the processor;

a fourth input for receiving a test signal, an amplifier for adjusting the amplitude of said test signal, and a fourth output receiving the amplifier output for coupling the test signal to said arcing-fault sensor;

at least one power-line input for receiving the power line signal, signal conditioning means for adjusting at least the amplitude of the power line signal, and a power-line output receiving the adjusted power line signal for coupling that signal to the processor, and a watch-dog circuit for receiving a watch-dog signal output from the processor, determining from said watch-dog signal whether the processor is active, and producing a trip signal if it is determined that the processor is not active.

14. A method for detecting faults in an electrical power line using a circuit and a processor-controlled device connected to at least one electrical power line so that the combination of the circuit and the processor-controlled device can detect faults in the power line, said method comprising, at said circuit:

receiving an alternating signal from an arcing-fault sensor coupled to said power line;

passing those components of said alternating signal within a prescribed frequency band;

comparing those components of said alternating signal within said prescribed frequency band with a predetermined threshold and producing an output signal when the predetermined threshold is exceeded;

producing an output pulse corresponding to the output signal;

coupling the output pulses to a processor;

integrating said alternating signal and producing a signal representing the resulting integral;

producing an output signal representing the absolute value of that integral; and coupling the output signal to the processor.

15. The method of claim 14 which includes:

receiving a signal from a ground-fault sensor coupled to said power line;

amplifying the ground-fault signal from the ground-fault sensor;

producing an output signal representing the absolute value of the amplified ground-fault signal; and coupling the absolute-value ground-fault signal to the processor.

16. The method of claim 14 which includes:

passing those components of said alternating signal within a second prescribed frequency band;

comparing the components of said alternating signal within said second prescribed frequency band with a second predetermined threshold and producing a second output signal when the second predetermined threshold is exceeded;

receiving the second output signal and producing a corresponding second output pulse;

receiving said output pulses and said second output pulses and producing a further output pulse when both output pulses occur at substantially the same time; and receiving the further output pulses and coupling those pulses to the processor.

17. The method of claim 14 which includes receiving a test signal, adjusting the amplitude of said test signal, and coupling the amplitude adjusted test signal to said arcing-fault sensor.

18. The method of claim 14 which includes receiving a power line signal, adjusting at least the amplitude of the power line signal, and coupling the adjusted power line signal to the processor.

19. The method of claim 14 which includes receiving a watch-dog signal output from the processor, determining from said watch-dog signal whether the processor is active, and producing a trip signal if it is determined that the processor is not active.

* * * * *